No. 648,524.  
I. POFFENBERGER.  
RUBBER TIRE.  
(Application filed Feb. 16, 1900.)  
Patented May 1, 1900.

(No Model.)

Witnesses.  
Clarence E. Mehlhope  
Edward Haat

Inventor.  
Ira Poffenberger,  
By Arthur Stem  
Attorney.

UNITED STATES PATENT OFFICE.

IRA POFFENBERGER, OF URBANA, OHIO, ASSIGNOR OF TWO-THIRDS TO STEPHEN B. PAYNE AND THOMAS J. FRANK, OF SAME PLACE.

RUBBER TIRE.

SPECIFICATION forming part of Letters Patent No. 648,524, dated May 1, 1900.

Application filed February 16, 1900. Serial No. 5,435. (No model.)

*To all whom it may concern:*

Be it known that I, IRA POFFENBERGER, a citizen of the United States, and a resident of Urbana, in the county of Champaign and State of Ohio, have invented certain new and useful Improvements in Rubber Tires, of which the following is a full, clear, and exact description, reference being had to the accompanying drawings, forming part of this specification.

My invention relates to certain improvements in the means used for securing a solid-rubber tire to the wheels of any vehicle; and by the use of my improvements it becomes possible to affix the rubber tire to the wheels without the necessity of first removing the steel tire, thus producing what may be termed in a sense a "portable" tire, all of which will be more fully hereinafter pointed out and claimed.

Figure 1:
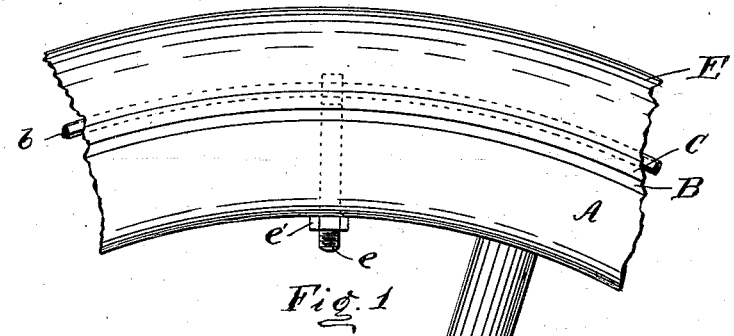
Figure 2:
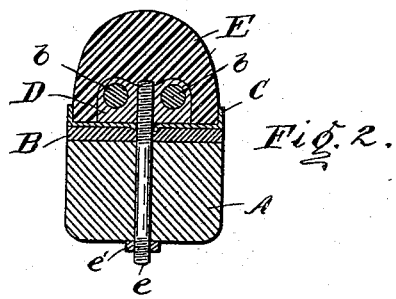
Figure 3:
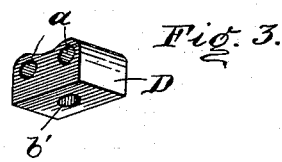
Figure 4:
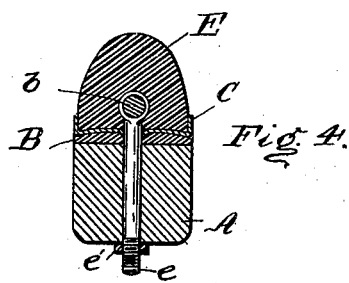
Figure 5:
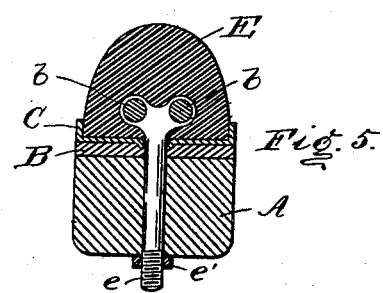

In the drawings, Figure 1 is a sectional side view of a wheel provided with my improvements. Fig. 2 is a cross-sectional view showing one form of my invention for securing the rubber tire to the wheel. Fig. 3 is a perspective view of the block or nut in Fig. 2. Fig. 4 is a view in cross-section of another form or method of securing the rubber tire in place, and Fig. 5 is a similar view of a modification of the form shown in Fig. 4.

Like letters of reference indicate identical parts in all the figures.

A is the felly of the wheel, and B is the ordinary steel tire, which is generally secured to the felly by small bolts, which pass through holes previously bored in the steel tire and registering with holes in the felly, the number of these bolts depending upon the size of and the spokes to the wheel.

C is a steel flange which by reason of the fact that one purpose of my invention is to secure the rubber tire to a wheel with the ordinary steel tire may be of very light or thin material, it not being necessary to employ the heavy steel flange, as heretofore.

In Figs. 2 and 3 I have shown a block or nut D, which is provided with transverse holes *a a*, Fig. 3, and another hole *b'* extending up through the block D, which hole is provided with screw-threads. This block D is inserted in the under side of the rubber tire E, which is cut away to permit such insertion, as shown in Fig. 2.

The rubber tire E is molded with longitudinal openings, which correspond and register with the openings or holes *a* in the block or nut D when this nut is inserted in place in the rubber tire.

Intermediate the rubber tire E and the ordinary steel tire B, I provide a light steel flange C. This steel flange C and also the rubber tire E, I prefer making of a length to fit the circumference of the wheel which it is intended to provide with my improved tire. This steel flange C is provided with holes, which I prefer to have punched into it at points registering with the bolt-holes in the ordinary steel tire. This is made possible by reason of the light flange I am able to use with my improved tire. The holes being punched into the flange necessarily produce burs at the under side of the flange surrounding the holes, and when the flange is put in place the bur enters the bolt-hole in the steel tire and prevents any side slippage.

The tire is put in place in the following manner: The rubber tire is provided at points corresponding with the bolt-holes in the wheel with cut-out portions of a size sufficient to permit the insertion of the blocks or nuts D. After the insertion of the blocks the steel wires *b b* are then inserted in the openings in the rubber tire and pass through the openings *a* in the block D, which are inserted at points in the rubber tire registering with the bolt-holes in the wheel-felly, and this wire may either be in two sections or one piece, as desired. The steel flange C is then placed on the periphery of the wheel or over the ordinary steel wire and the rubber tire placed in the flange C, with the openings *b'* in the blocks D registering with the tire bolt-holes. The shank of the bolt *e*, which is screw-threaded at both ends, is then passed up through the bolt-holes and screwed into the opening *b'* in the block D. The nut *e'* is then screwed onto the end of the bolt *e*, extending out of the hole in the felly, as shown in Figs. 1 and 2, and the various parts are thus securely held in place, making a very rigid tire.

By the use of my construction it becomes unnecessary to employ a deep flange, as was the case heretofore, with the flaring sides; but by the employment of my improvement the necessity for such a flange is obviated and to that extent the cost of equipment lessened.

In Figs. 4 and 5 I have shown modifications in which, in place of the block D, I employ eyebolt e, either with the single eye, as shown in Fig. 4, preferably for use when the narrow tire is employed, or the double eyebolt (shown in Fig. 5) for use with the broad tires. When using the eyebolt construction, the rubber tire need only be provided with slits at points that register with the bolt-holes in the felly, especially when using the single eyebolt, which can be pressed into place. Of course when employing the eyebolts the shank and head are made integral.

As one object of my invention is to apply rubber tires to old wheels without the necessity of removing the ordinary steel tire, I have illustrated in Fig. 4 the steel flange slightly concave. After some use the steel tires usually become worn at the edges or sides, and thus make the steel tire somewhat convex, as shown in cross-section, Fig. 4. In order that the flange may fit closely on the steel tire and also to assist the bur in the flange, heretofore spoken of, in preventing side slippage and also reduce the side strain which a side blow would produce on the bolts, I prefer to provide the flange either with a bead or bevel, as shown in Fig. 4.

By the use of my invention the difficulty encountered with some of the constructions heretofore employed of "creeping" of the tire is of course entirely obviated, as the bolts placed at regular intervals between the spokes and entering the rubber make it impossible for the rubber tire to "creep" when the wheels are in use, and the use of a considerably-less quantity of rubber is possible than with tires as heretofore constructed, which were held onto the wheel by welding or fastening together the ends of the wire running through the rubber, which had to be done after the tire was in place on the wheel, in which case it was also necessary, in order to hold the tire as securely as possible on the wheel, to draw the ends of the wire together. This all becomes unnecessary when employing my invention, as the tire is rigidly held in place by merely screwing the nuts e' snugly against the felly, thus drawing the wire, with the rubber tire, down against the felly.

I am aware that it has also heretofore been customary to provide a bolt with hooked ends; but when employing such construction it was possible by a strong side blow against the rubber tire to press the wire from beneath the hook and permit it to slip over the hook, and thus loosen the tire. Furthermore, in such construction it was customary to cut out a portion of the rubber at its under side to permit the proper placing of the hooked bolts, and thus weakening the rubber tire to that extent, as the opening was larger than the hooked portion of the bolt, which did not completely fill the opening or slot.

I am also aware that eyebolts placed crosswise have been used, each alternate bolt passing from right to left and each intermediate bolt passing from left to right. By the use of such construction the tire is left with a portion on either side of the tire that is not securely held in place; but

What I claim as my invention, and desire to secure by Letters Patent, is—

1. In a tire for wheels comprising a rubber tread, having longitudinal openings, and slots provided at predetermined intervals on the inner circumference of said rubber tread, the combination of a flange intermediate the tread and wheel-felly, and a block having transverse holes and a screw-threaded opening at right angles to said transverse openings, said block inserted in the slots in said tread and the transverse holes registering with the longitudinal openings in the rubber tread, with a shank screw-threaded at both ends and adapted to pass through the wheel-felly and flange and screw into said block, the protruding end adapted to receive a nut, and wire passing through said longitudinal opening in the tread and the transverse opening in the block, substantially in the manner and for the purpose described.

2. In a portable tire for wheels comprising a rubber tread having longitudinal openings, and slots at predetermined intervals on the inner circumference of said tread, with one or more sections of wire passing through said longitudinal openings in the tread, the combination of a convex flange intermediate the tread and steel tire, said flange provided with burs on the side adjacent the steel tire and surrounding the bolt-openings, with an eye-block inserted in the slot in the tread, and the eye arranged to register with the longitudinal opening in the tread for the passage of the wire, said eye-block adapted to receive a screw-threaded shank, the opposite end protruding through the flange and felly to receive the nut to secure the parts together, substantially as shown and in the manner specified.

3. In a rubber tire for wheels, the combination of a rubber tread, having longitudinal openings therein and one or more sections of wire, passing through said openings, a flange intermediate the tread and wheel-felly, said flange provided with holes at predermined intervals and the holes having burs on the side adjacent the felly, and blocks having a screw-threaded opening registering with the tire bolt-holes in the felly, said block adapted to be inserted in the rubber tread and having transverse openings registering with the longitudinal openings in the tread for the passage of the wires, with a screw-threaded shank passing through the felly and flange and screwing into the block and adapted to be held in place by a nut, substantially as shown and in the manner specified.

IRA POFFENBERGER.

Witnesses:
T. P. CROUSE,
ROBERT SIMPSON.